United States Patent
Kenawy

(10) Patent No.: US 10,924,311 B1
(45) Date of Patent: Feb. 16, 2021

(54) MULTI-STANDARD BCPM DEMODULATOR USING VITERBI ALGORITHM

(71) Applicant: Dialog Semiconductor B.V., 's-Hertogenbosch (NL)

(72) Inventor: Hamed Kenawy, Eindhoven (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 16/875,186

(22) Filed: May 15, 2020

(51) Int. Cl.
*H04L 27/14* (2006.01)

(52) U.S. Cl.
CPC .................................. *H04L 27/14* (2013.01)

(58) Field of Classification Search
CPC ....... H04L 1/0054; H04L 27/14; H04L 27/10; H04L 27/22
See application file for complete search history.

(56) References Cited

U.S. PATENT DOCUMENTS

| | | | | |
|---|---|---|---|---|
| 2003/0138055 A1* | 7/2003 | Saito | ........................ | H04L 25/06 375/262 |
| 2016/0353398 A1* | 12/2016 | de Ruijter | ........... | H04W 56/001 |
| 2017/0180171 A1* | 6/2017 | Hosseini | .................. | H04L 27/14 |
| 2017/0195149 A1* | 7/2017 | Moon | ...................... | H04B 7/26 |

OTHER PUBLICATIONS

"Low-Effort High-Performance Viterbi-based Receiver for Bluetooth LE Applications," Ye Zhang et al., 2013 IEEE International Symposium on Circuits and Systems (ISCAS), May 19-23, 2013, pp. 1930-1933.
"Noncoherent Sequence Detection Receiver for Bluetooth Systems," Lutz Lampe et al., IEEE Journal on Selected Areas in Communications ( vol. 23 , Issue: 9 ), Sep. 6, 2005, 10 pages.
"Continuous Phase Modulation," Carl-Erik Sundberg, IEEE Communications Magazine ( vol. 24 , Issue: 4 , Apr. 1986 ), pp. 25-38.

\* cited by examiner

*Primary Examiner* — Kevin Kim
(74) *Attorney, Agent, or Firm* — Saile Ackerman LLC; Stephen B. Ackerman

(57) ABSTRACT

The present document relates to a Viterbi-based GFSK (Gaussian frequency-shift keying) demodulator that supports different modulation index ranges. In particular, the present document relates to a circuit and a corresponding method for demodulating a base band signal. For example, the base band signal may have an in-phase component and a quadrature component. The method includes determining a phase-modulated signal based on the base band signal. The method includes determining a scaled phase signal by scaling the phase-modulated signal using a scaling factor. The method includes determining discrimination signals based on the scaled phase signal using a periodic discrimination function. The method includes applying a Viterbi algorithm to the discrimination signals for determining an output signal.

23 Claims, 3 Drawing Sheets

| $d_1[k], -d_2[k], -d_3[k]$ | | | | | | | $a[k-2]$ | $a[k-1]$ | $a[k]$ |
|---|---|---|---|---|---|---|---|---|---|
| 1 | -1 | -1 | 1 | 1 | -1 | 1 | -1 | -1 | -1 |
| -1 | -1 | -1 | 1 | -1 | 1 | 1 | -1 | -1 | 1 |
| -1 | 1 | -1 | 1 | 1 | -1 | -1 | 1 | -1 | -1 |
| 1 | 1 | 1 | -1 | -1 | -1 | -1 | -1 | 1 | -1 |
| 1 | -1 | 1 | 1 | -1 | 1 | -1 | -1 | 1 | 1 |
| -1 | -1 | 1 | -1 | 1 | 1 | -1 | 1 | 1 | -1 |
| -1 | 1 | 1 | -1 | -1 | -1 | 1 | 1 | 1 | 1 |

MULTI-STANDARD BCPM DEMODULATOR USING VITERBI ALGORITHM

TECHNICAL FIELD

The present document relates to a demodulator and a corresponding method that can be used with different radio communication standards. In particular, the present document relates to a Viterbi-based GFSK (Gaussian frequency-shift keying) demodulator that supports different modulation index ranges.

BACKGROUND

Gaussian frequency shift keying (GFSK) is a special type of Continuous Phase Modulation (CPM). It is mainly used in different flavours of low power communications, especially Bluetooth Low Energy (BLE) and Bluetooth classic, basic rate (BR). For GFSK demodulation, the optimal demodulator may use the Viterbi algorithm to achieve a reference bit-error-rate (BER) at a very low signal-to-noise-ratio (SNR) of only 7 dB in case of BLE. However, this can only be achieved if the modulation index h is fixed such as e.g. in GSM. At this, the modulation index h may be defined as a metric for the changes of the carrier frequency. More specifically, the modulation index h may indicate how much the carrier frequency is changed as a function of a 1 or 0 in the data, normalized to the bitrate. In practical protocols, such as DECT (Digital Enhanced Cordless Telecommunications) and Bluetooth, the modulation index is allowed to vary within a tolerance window. Therefore, the optimum receiver is not a feasible solution for a practical protocol, but it can be considered as a benchmark.

Different GFSK Viterbi demodulators have been proposed that are suitable for Bluetooth classic (BR). For example, these demodulators estimate the modulation index from the first part of the packet and then start to work with its optimum performance. These solutions are not suitable for the BLE protocol because in BLE, the main focus lies on the Packet Error Rate (PER) and not on the Bit Error Rate (BER). Hence, if there is one bit-error in the packet, the packet would be dropped. So, if one demodulates some bits wrongly during the modulation index estimation phase, the complete packet would be considered erroneous, even though the BER could still be acceptable.

Other proposed Viterbi demodulators are suitable for the BLE protocol. However, these demodulators are only suitable for special cases, e.g. when the modulation index is h=0.5 (such as BLE and DECT). They cannot be adapted to work on other modulation index ranges. Hence, in the prior art, there is no Viterbi-based demodulator that supports different modulation index ranges. In other words, there is no single GFSK Viterbi demodulator that can be used with different radio communication standards.

SUMMARY

According to an aspect, a method of demodulating a base band signal is presented. For example, the base band signal may comprise an in-phase component and a quadrature component. However, different base band representations are possible. The method may comprise determining a phase-modulated signal $\varphi$ based on the base band signal. In particular, the method may comprise determining the phase-modulated signal $\varphi$ based on the in-phase component and the quadrature component of the base band signal. The method may further comprise determining a scaled phase signal $\varphi_S$ by scaling the phase-modulated signal $\varphi$ using a scaling factor. The method may further comprise determining m discrimination signals based on the scaled phase signal $\varphi_S$ using a periodic discrimination function. The method may further comprise applying a Viterbi algorithm to the discrimination signals for determining an output signal.

Instead of determining the discrimination signals directly from the in-phase component and the quadrature component of the base band signal, the discrimination signals may be computed based on the scaled phase signal, which may be in turn obtained by scaling (i.e. multiplying) the phase-modulated signal $\varphi$ with the scaling factor. As a result, the described demodulation method becomes suitable for any modulation index windows. As will be described in further detail below, the scaling factor may be chosen such that e.g. both BLE and Bluetooth BR signals may be demodulated using the same circuit. At the same time, the complexity of the Viterbi algorithm is reduced substantially, resulting in a faster decoding process and reduced power consumption.

The method may further comprise determining the scaling factor based on a communication standard used for generating the base band signal. For example, the method may comprise determining the scaling factor based on a modulation index associated with the base band signal. In this regard, the modulation index h may indicate how much the carrier frequency is changed as a function of a 1 or 0 in the data, normalized to the bitrate. For example, the method may comprise determining the scaling factor to be 0.5/h, wherein h denotes the modulation index. That is, if the modulation index h is 0.5 (such as e.g. in a BLE packet), the scaling factor may be set to be 1. If, however, the modulation index h is 0.32 (such as e.g. in a Bluetooth BR packet), the scaling factor may be set to be approximately 1.56. In general, the method may comprise determining the scaling factor such that an accumulated phase over a symbol duration is normalized close to a value of $\pi/2$.

The periodic discrimination function may include at least one of: a sinus-shaped function, a triangular-shaped function, and a rectangular-shaped function. For example, the periodic discrimination function may exhibit a period of $2\pi$. More specifically, the m discrimination signals are determined using the below periodic discrimination function $d_m[n]$:

$$d_m[n] = \begin{cases} \sin(\varphi_s[n - m \cdot N_s] - \varphi_s[n]), & m = \text{odd} \\ \cos(\varphi_s[n - m \cdot N_s] - \varphi_s[n]), & m = \text{even}, \end{cases}$$

wherein n is an index of a current data symbol and $N_S$ is an oversampling ratio. The above periodic discrimination function $d_m[n]$ is however only a non-limiting example. In general, the periodic discrimination function may include at least one of: a first periodic function whose output values at 0, $\pi/2$, $\pi$, and $3\pi/2$ equal the output values of the sine function at 0, $\pi/2$, $\pi$, and $3\pi/2$, respectively, and a second periodic function whose output values at 0, $\pi/2$, $\pi$, and $3\pi/2$ equal the output values of the cosine function at 0, $\pi/2$, $\pi$, and $3\pi/2$, respectively.

Further, the method may comprise applying the Viterbi algorithm using the below branch metric $$c[k] = \sum_{m=1}^{M} \left( \prod_{j=1}^{m} a[k - j + 1] + (-1)^{\lceil \frac{m}{2} \rceil + 1} d_m[k] \right),$$

wherein a[k] is the kth data symbol and $d_m[k]$ is the periodic discrimination function. The method may comprise determining a maximum likelihood sequence with a minimum path metric $$C_{L_{tb}}(L_{tb}) = \min\left(\sum_{k=1}^{L_{tb}} c[k]\right),$$

wherein $L_{tb}$ denotes a trace back length of the Viterbi algorithm.

The method may further comprise determining the phase-modulated signal φ by determining a frequency-modulated signal based on the in-phase component I and the quadrature component Q of the base band signal by performing an arctangent operation on the ratio Q/I and by differentiating the result of the arctangent operation, and by determining the phase-modulated signal φ based on the frequency-modulated signal. For example, the phase-modulated signal φ may be determined by integrating or summing the frequency-modulated signal.

The method may further comprise determining a start of a data packet by correlating the frequency-modulated signal with a known sequence. The method may further comprise estimating a carrier frequency offset from a preamble of the data packet and subtracting the estimated carrier frequency offset from the frequency-modulated signal.

According to a further aspect, a software program is described. The software program may be adapted for execution on a processor and for performing the method steps outlined in the present document when carried out by the processor.

According to another aspect, a storage medium is described. The storage medium may comprise a software program adapted for execution on a processor and for performing the method steps outlined in the present document when carried out by the processor.

According to a further aspect, a computer program product is described. The computer program product may comprise instructions for performing the method steps outlined in the present document when carried out by the processor.

According to another aspect, a circuit for demodulating a base band signal is described. The circuit may comprise functional features which correspond to the steps of the demodulating method described in the present document. In particular, the circuit may comprise a phase extraction circuit configured to determine a phase-modulated signal φ based on the base band signal. More specifically, the phase extraction unit may be configured to determine the phase-modulated signal φ based on an in-phase component I and a quadrature component Q of the base band signal. The circuit may comprise a scaling circuit configured to determine a scaled phase signal $\varphi_S$ by scaling the phase-modulated signal φ using a scaling factor. The circuit may comprise a discrimination signal generator circuit configured to determine m discrimination signals based on the scaled phase signal $\varphi_S$ using a periodic discrimination function. The circuit may comprise a decoding circuit configured to apply a Viterbi algorithm to the m discrimination signals for determining an output signal.

The scaling circuit may be further configured to determine the scaling factor based on a communication standard used for generating the base band signal. For instance, the scaling circuit may be further configured to determine the scaling factor based on a modulation index associated with the base band signal. The scaling circuit may be configured to determine the scaling factor such that an accumulated phase over a symbol duration is normalized close to a value of π/2 or π.

The periodic discrimination function may comprise at least one of: a sinus-shaped function, a triangular-shaped function, and a rectangular-shaped function. In particular, the discrimination signal generator circuit may be configured to determine the m discrimination signals using the below periodic discrimination function $d_m[n]$:

$$d_m[n] = \begin{cases} \sin(\varphi_S[n - m \cdot N_S] - \varphi_S[n]), & m = \text{odd} \\ \cos(\varphi_S[n - m \cdot N_S] - \varphi_S[n]), & m = \text{even} \end{cases},$$

wherein n is an index of a current data symbol and $N_S$ is an oversampling ratio. Subsequently, the decoding circuit may be configured to apply the Viterbi algorithm using the below branch metric $$c[k] = \sum_{m=1}^{M}\left(\prod_{j=1}^{m} a[k - j + 1] + (-1)^{\lceil\frac{m+1}{2}\rceil} d_m[k]\right),$$

wherein a[k] is the kth data symbol and $d_m[k]$ is the periodic discrimination function. Moreover, the decoding circuit may be configured to apply the Viterbi algorithm by determining a maximum likelihood sequence with a minimum path metric $$C_{L_{tb}}(L_{tb}) = \min\left(\sum_{k=1}^{L_{tb}} c[k]\right),$$

wherein $L_{tb}$ denotes a trace back length of the Viterbi algorithm.

Furthermore, the phase extraction circuit may be configured to determine a frequency-modulated signal based on the in-phase component I and the quadrature component Q of the base band signal by performing an arctangent operation on the ratio Q/I and by differentiating the result of the arctangent operation. The phase extraction circuit may be configured to determine the phase-modulated signal φ based on the frequency-modulated signal. The phase extraction circuit may be configured to determine a start of a data packet by correlating the frequency-modulated signal with a known sequence. The phase extraction circuit may be configured to estimate a carrier frequency offset from a preamble of the data packet, and to subtract the estimated carrier frequency offset from the frequency-modulated signal.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which

FIG. 2 shows an exemplary GFSK Viterbi truth table; and

DESCRIPTION

In this document, a new Binary FSK (BFSK) or Binary CPM (BCPM) demodulator is proposed. This demodulator uses the Viterbi algorithm in a way that makes its performance insensitive to the modulation index tolerance and suitable for any modulation index window. In the prior art, demodulators have been proposed for e.g. the BLE protocol which has modulation index around h=0.5 (0.45≤h≤0.55). However, the demodulators described in the present document are valid for any modulation index range which makes it very suitable to be used in chips that support both BLE and Bluetooth BR.

Figure 1:
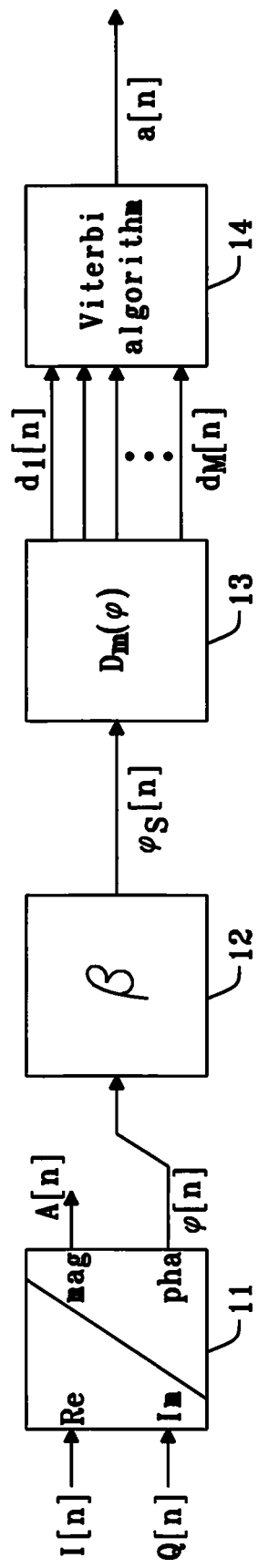
FIG. 1 shows a block diagram of an exemplary GFSK Viterbi demodulator.

FIG. 1 shows a block diagram of a proposed, exemplary GFSK Viterbi demodulator 1. An analog-to-digital ADC converter (not shown) may provide a base band signal which has a fixed amplitude cosine-component (I) and sine-component (Q) of a low-IF (intermediate frequency) carrier with frequency modulation. The exemplary demodulator 1 comprises a phase extraction circuit 11 configured to determine a phase-modulated signal φ[n] based on the in-phase component I[n] and the quadrature component Q[n] of the base band signal. The demodulator 1 further comprises a scaling circuit 12 configured to determine a scaled phase signal $\varphi_S[n]$ by scaling the phase-modulated signal φ[n] using a scaling factor β. The demodulator 1 further comprises a discrimination signal generator circuit 13 configured to determine M discrimination signals $d_m[n]$, with 1≤m≤M, based on the scaled phase signal $\varphi_S[n]$ using a periodic discrimination function. The demodulator 1 further comprises a decoding circuit 14 configured to apply a Viterbi algorithm to the M discrimination signals for determining a demodulated output signal a[n].

The scaling factor β may be set to be 0.5/h, wherein h denotes the modulation index of the received signal. That is, if the modulation index h is 0.5 (such as e.g. in a BLE packet), the scaling factor may be set to be 1. If, however, the modulation index h is 0.32 (such as e.g. in a Bluetooth BR packet), the scaling factor may be set to be approximately 1.5. In general, the scaling factor may be set such that an accumulated phase over a symbol duration is normalized close to a value of π/2.

The discrimination signal generator circuit 13 converts the scaled phase signal $\varphi_S[n]$ into M signals that contain information about the current data symbol and its M−1 predecessors. The knowledge about this history allows correction of errors in the symbol stream, significantly improving the sensitivity. Instead of generating the discrimination signals from the I-Q samples, it is proposed to generate them from the scaled phase signal $\varphi_S[n]$, which makes it possible to work over different modulation index ranges. This method also reduces the complexity. The discrimination signals can be generated as follows:

$$d_m[n] = \begin{cases} \sin(\varphi_S[n - m \cdot N_S] - \varphi_S[n]), & m = \text{odd} \\ \cos(\varphi_S[n - m \cdot N_S] - \varphi_S[n]), & m = \text{even} \end{cases},$$

where $N_S$ is the oversampling ratio. Thus, the discrimination signals can be generated directly from the scaled phase signal $\varphi_S[n]$. As we aim to create phase differences of around π/2 for each symbol, all discriminators with even valued m give phase differences close to 0 or π mod 2π, while the discriminators with odd valued m give phase differences that vary around the values π/2 and 3π/2 mod 2π. Hence, the cosine (even m) and sine (odd m) functions convert these phase differences towards a discriminator result of close to either 1 or −1, even if the phases are deviating a little from their ideal values.

Alternatively, the sine and cosine functions may be replaced by other functions that have the same periodicity such as e.g. triangle waves with varying impact on the performance.

The down-sampled version of the discrimination signals can be written in another form:

$$d_m[k] = (-1)^{\lceil \frac{m}{2} \rceil} \cdot \prod_{j=1}^{m} a[k - j + 1],$$

where $d_m[k]$ is the down-sampled version of the discrimination signals $d_m[n]$ and a[k] is the kth information symbol. For the example m=[1:3] we get:

$d_1[k]=-a[k]$, $d_2[k]=-a[k]\cdot a[k-1]$, $d_3[k]=a[k]\cdot a[k-1]\cdot a[k-2]$.

From the above relations, we can generate the GFSK Viterbi truth table 2 illustrated in FIG. 2. It is evident from truth table 2 that the received sequence can be represented in a state diagram. This state diagram has the property that from any specific state (i.e. a[k]) one can go only to two other states. Hence, if an error occurred at the receiver and from a specific state we moved to an unexpected state, this error can be recovered by the Viterbi algorithm.

Therefore, the cost function (or the branch metric, c[k]) of the Viterbi algorithm based on the previous example can be written as $c[k]=(a[k]+d_1[k])^2+(a[k]a[k-1]+d_2[k])^2+(a[k]a[k-1]a[k-2]-d_3[k])^2$ or generally, $$c[k] = \sum_{m=1}^{M} \left( \prod_{j=1}^{m} a[k - j + 1] + (-1)^{\lceil \frac{m}{2} + 1 \rceil} d_m[k] \right).$$

The Viterbi algorithm may feature $2^{M-1}$ states and $L_{tb}$ trace back length. At each state, we select a survival path which is the minimum of c[k] plus the previous path metric. The maximum likelihood sequence is the sequence that has the minimum path metric after $L_{tb}$ bits, i.e.

$$C_{L_{tb}}(L_{tb}) = \min\left(\sum_{k=1}^{L_{tb}} c[k]\right).$$

Figure 3:
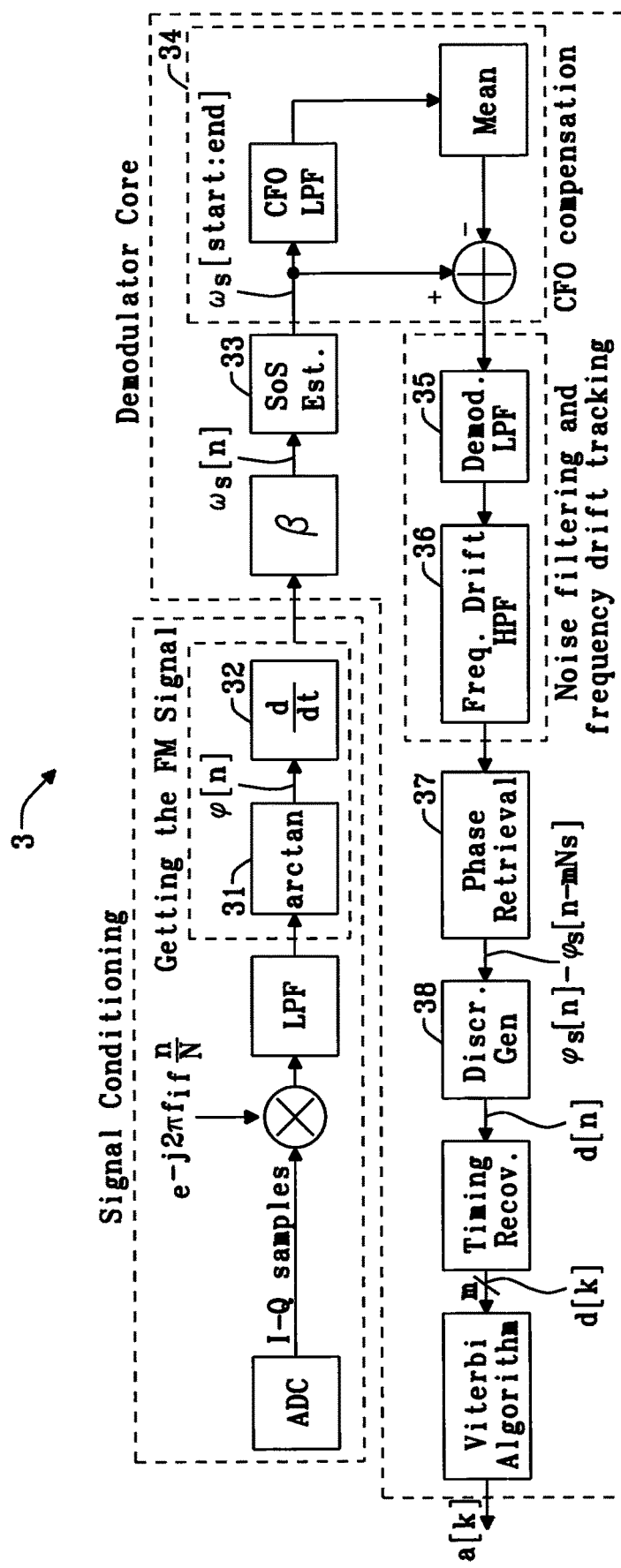
FIG. 3 shows a more detailed block diagram of an exemplary GFSK Viterbi demodulator.

The previous block diagram in FIG. 1 describes the main blocks that may be necessary for the Viterbi demodulator. However, there are some other blocks that, dependent on the protocol, might be needed to detect the start of the signal, mitigate the Carrier Frequency Offset (CFO), and/or the frequency drift. FIG. 3 shows a more detailed block diagram of an exemplary GFSK Viterbi demodulator 3, which targets a combination of Bluetooth protocols (BLE and Bluetooth BR). This block diagram contains some solutions for the above-mentioned problems. Instead of relying on the scaled phase signal directly, a frequency-modulated (FM) signal is processed first. The FM signal is obtained by determining, in block 31, an arctangent of the ratio Q/I followed by a differentiator 32. The start of the data packet is detected by the Start of Signal (SoS) detection block 33, by correlation with a known sequence. This serves to down-sample the signal before the Viterbi calculations are done. But first, in block 34, the CFO can be estimated and compensated by subtracting its value from the original FM signal. The noise that is generated by the differentiator 32 could be filtered out using a LPF in block 35. The carrier frequency drift (a low-frequency variation in the FM signal) could be cancelled by a HPF in block 36. The scaled phase signal ($\varphi_s[n]$) may then be retrieved from the FM ($\omega_s[n]$) signal in block 37 as follows:

$$\varphi_s[n] = \sum_{k=1}^{n} \omega_s[k]$$

and $$\varphi_s[n - m \cdot N_s] = \sum_{k=1}^{n - m \cdot N_s} \omega_s[k],$$

hence $$\varphi_s[n] - \varphi_s[n - m \cdot N_s] = \sum_{k=n-m \cdot N_s+1}^{n} \omega_s[k].$$

Block 38 in FIG. 3 then corresponds to the discrimination signal generator circuit 13 of FIG. 1, and the demodulated output signal â[k] may be determined accordingly. Further, timing recovery and down-sampling may be done. The Viterbi algorithm may then be applied on the down-sampled version of the discrimination signals, which reduces the overall complexity significantly.

In summary, the invention is a novel Viterbi demodulator that can work on BFSK or BCPM signals with non-constant modulation index of which the nominal value may be an arbitrary value. In other words, the modulation index is not required to be a tightly controlled value and some tolerance (which for typical BFSK protocols is +/−10%) is supported. The proposed demodulator applies a Viterbi algorithm on a scaled phase signal instead of the I-Q samples. Hence, the FM signal can be scaled such that the modulation index appears to be around h=0.5 to get an optimum performance.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A method of demodulating a base band signal, the method comprising:
   determining a phase-modulated signal $\varphi$ based on the base band signal,
   determining a scaled phase signal $\varphi_S$ by scaling the phase-modulated signal $\varphi$ using a scaling factor,
   determining M discrimination signals based on the scaled phase signal $\varphi_S$ using a periodic discrimination function, and
   applying a Viterbi algorithm to the M discrimination signals for determining an output signal.

2. The method of claim 1, wherein determining the scaled phase signal $\varphi_S$ includes
   determining the scaling factor based on a communication standard used for generating the base band signal.

3. The method of claim 1, wherein determining the scaled phase signal $\varphi_S$ includes
   determining the scaling factor based on a modulation index associated with the base band signal.

4. The method of claim 1, wherein determining the scaled phase signal $\varphi_S$ includes
   determining the scaling factor such that an accumulated phase over a symbol duration is normalized close to a value of $\pi/2$.

5. The method of claim 1, wherein the periodic discrimination function includes at least one of: a sinus-shaped function, a triangular-shaped function, and a rectangular-shaped function.

6. The method of claim 1, wherein the periodic discrimination function includes at least one of:
   a first periodic function whose output values at 0, $\pi/2$, $\pi$, and $3\pi/2$ equal the output values of the sine function at 0, $\pi/2$, $\pi$, and $3\pi/2$, respectively, and
   a second periodic function whose output values at 0, $\pi/2$, $\pi$, and $3\pi/2$ equal the output values of the cosine function at 0, $\pi/2$, $\pi$, and $3\pi/2$, respectively.

7. The method of claim 1, wherein the M discrimination signals are determined using the below periodic discrimination function $d_m[n]$:

$$d_m[n] = \begin{cases} \sin(\varphi_S[n - m \cdot N_S] - \varphi_S[n]), & m = \text{odd} \\ \cos(\varphi_S[n - m \cdot N_S] - \varphi_S[n]), & m = \text{even} \end{cases},$$

wherein n is an index of a current data symbol, $1 \leq m \leq M$ is an index of the discrimination signals, and $N_S$ is an over-sampling ratio.

8. The method of claim 1, wherein applying the Viterbi algorithm includes using the below branch metric $$c[k] = \sum_{m=1}^{M} \left( \prod_{j=1}^{m} a[k-j+1] + (-1)^{\lceil \frac{m+1}{2} \rceil} d_m[k] \right),$$

wherein a[k] is the kth data symbol and $d_m[k]$ is the periodic discrimination function.

9. The method of claim 8, wherein applying the Viterbi algorithm includes
   determining a maximum likelihood sequence with a minimum path metric $$C_{L_{tb}}(L_{tb}) = \min\left(\sum_{k=1}^{L_{tb}} c[k]\right),$$

wherein $L_{tb}$ denotes a trace back length of the Viterbi algorithm.

10. The method of claim 1, wherein determining the phase-modulated signal φ includes determining a frequency-modulated signal based on an in-phase component I and a quadrature component Q of the base band signal by performing an arctangent operation on the ratio Q/I and by differentiating the result of the arctangent operation, and determining the phase-modulated signal φ based on the frequency-modulated signal.

11. The method of claim 10, further comprising determining a start of a data packet by correlating the frequency-modulated signal with a known sequence.

12. The method of claim 11, further comprising estimating a carrier frequency offset from the data packet, and subtracting the estimated carrier frequency offset from the frequency-modulated signal.

13. A circuit for demodulating a base band signal, the circuit comprising:

a phase extraction circuit configured to determine a phase-modulated signal φ based on the base band signal, a scaling circuit configured to determine a scaled phase signal $φ_S$ by scaling the phase-modulated signal φ using a scaling factor, a discrimination signal generator circuit configured to determine M discrimination signals based on the scaled phase signal $φ_S$ using a periodic discrimination function, and a decoding circuit configured to apply a Viterbi algorithm to the M discrimination signals for determining an output signal.

14. The circuit of claim 13, wherein the scaling circuit is further configured to determine the scaling factor based on a communication standard used for generating the base band signal.

15. The circuit of claim 13, wherein the scaling circuit is further configured to determine the scaling factor based on a modulation index associated with the base band signal.

16. The circuit of claim 13, wherein the scaling circuit is further configured to determine the scaling factor such that an accumulated phase over a symbol duration is normalized close to a value of π/2.

17. The circuit of claim 13, wherein the periodic discrimination function includes at least one of: a sinus-shaped function, a triangular-shaped function, and a rectangular-shaped function.

18. The circuit of claim 13, wherein the discrimination signal generator circuit is configured to determine the M discrimination signals using the below periodic discrimination function $d_m[n]$:

$$d_m[n] = \begin{cases} \sin(\varphi_S[n - m \cdot N_S] - \varphi_S[n]), & m = \text{odd} \\ \cos(\varphi_S[n - m \cdot N_S] - \varphi_S[n]), & m = \text{even} \end{cases},$$

wherein n is an index of a current data symbol, 1≤m≤M is an index of the discrimination signals, and $N_S$ is an over-sampling ratio.

19. The circuit of claim 13, wherein the decoding circuit is configured to apply the Viterbi algorithm using the below branch metric $$c[k] = \sum_{m=1}^{M}\left(\prod_{j=1}^{m} a[k-j+1] + (-1)^{\lceil\frac{m+1}{2}\rceil} d_m[k]\right),$$

wherein a[k] is the kth data symbol and $d_m[k]$ is the periodic discrimination function.

20. The circuit of claim 19, wherein the decoding circuit is configured to apply the Viterbi algorithm by determining a maximum likelihood sequence with a minimum path metric $$C_{L_{tb}}(L_{tb}) = \min\left(\sum_{k=1}^{L_{tb}} c[k]\right),$$

wherein $L_{tb}$ denotes a trace back length of the Viterbi algorithm.

21. The circuit of claim 13, wherein the phase extraction circuit is configured to determine a frequency-modulated signal based on an in-phase component I and a quadrature component Q of the base band signal by performing an arctangent operation on the ratio Q/I and by differentiating the result of the arctangent operation, and determine the phase-modulated signal φ based on the frequency-modulated signal.

22. The circuit of claim 21, wherein the phase extraction circuit is configured to determine a start of a data packet by correlating the frequency-modulated signal with a known sequence.

23. The circuit of claim 22, wherein the phase extraction circuit is configured to estimate a carrier frequency offset from the data packet, and subtract the estimated carrier frequency offset from the frequency-modulated signal.

* * * * *